Nov. 30, 1948.
G. S. PAPAS
2,455,086
CENTRIFUGALLY OPERATED, EXPANDING SHOE TYPE, AUTOMATIC CLUTCH
Filed June 26, 1946
2 Sheets-Sheet 1
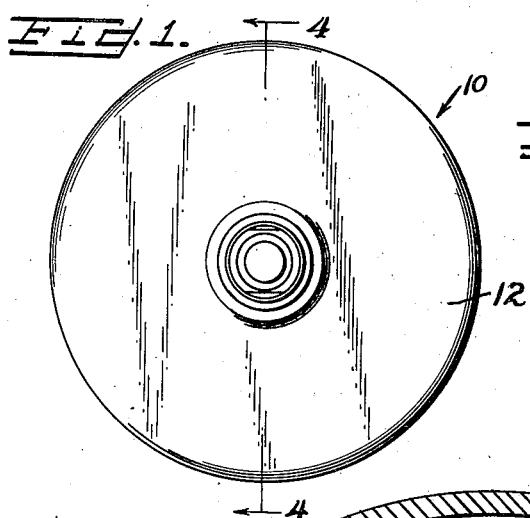
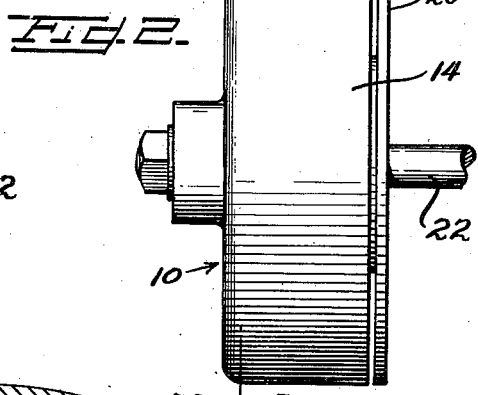
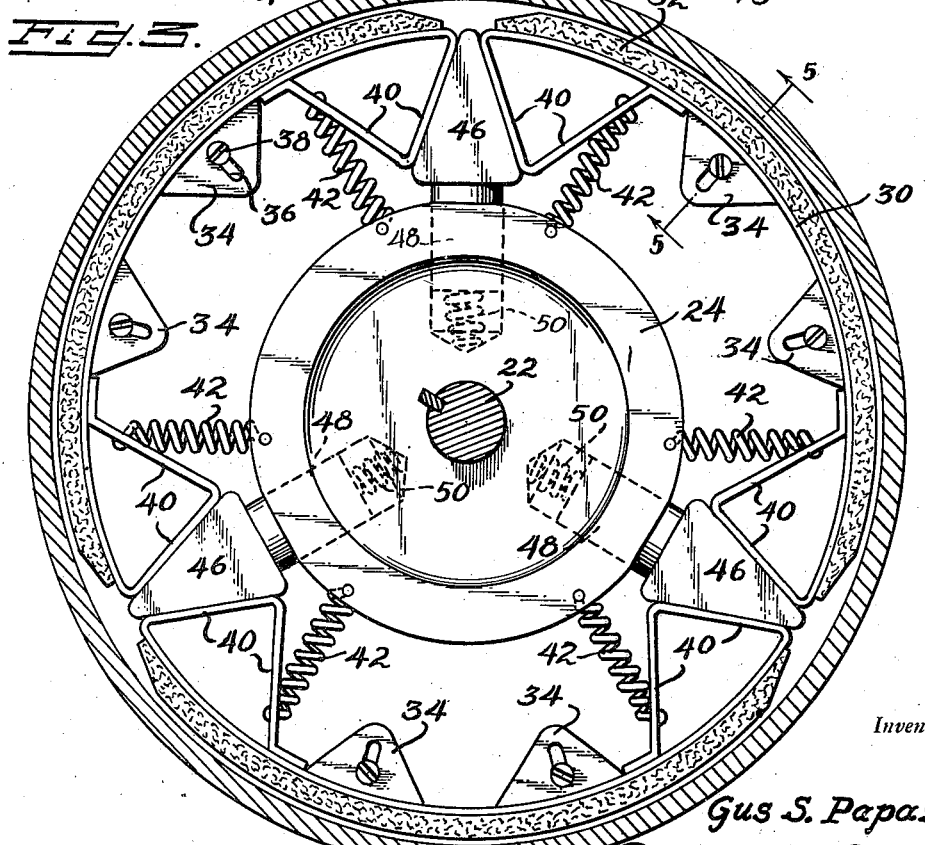
Inventor
Gus S. Papas-
By Clarence A. O'Brien
and Harvey B. Jacobson
Attorneys Nov. 30, 1948.  G. S. PAPAS  2,455,086
CENTRIFUGALLY OPERATED, EXPANDING
SHOE TYPE, AUTOMATIC CLUTCH
Filed June 26, 1946  2 Sheets-Sheet 2
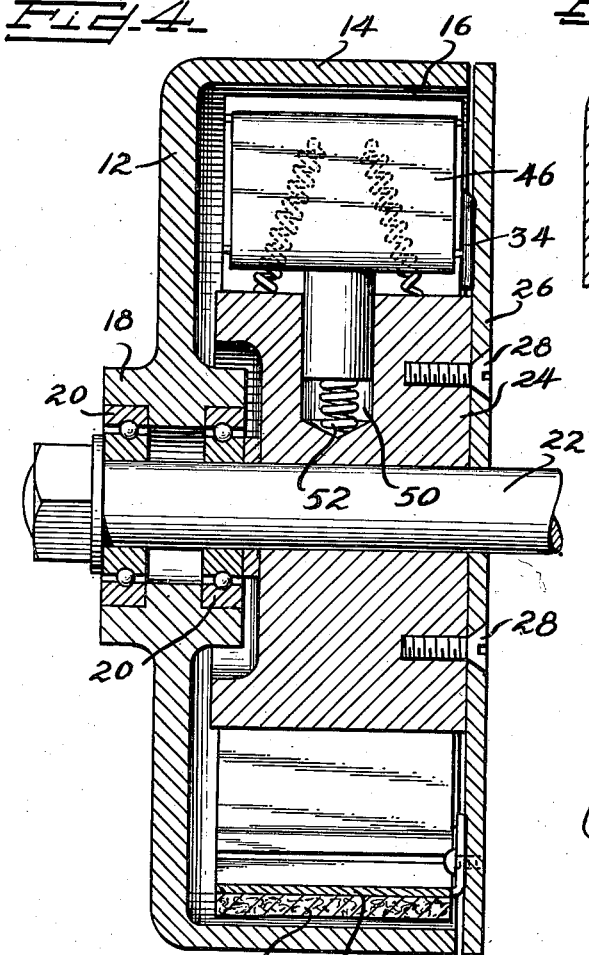
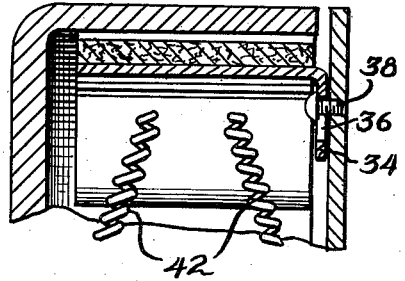
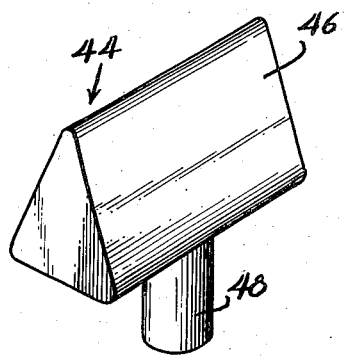
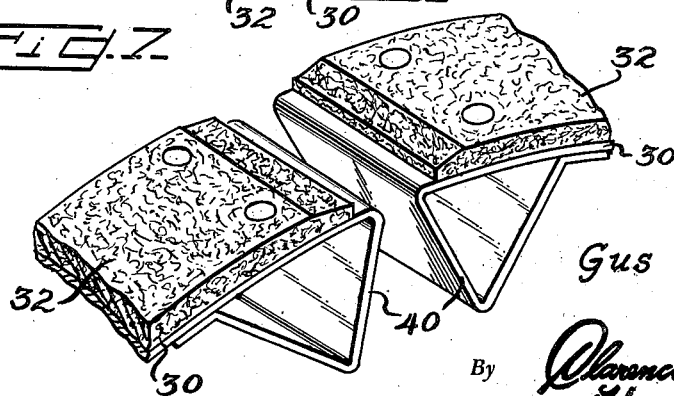
Inventor
Gus S. Papas
By Clarence A. O'Brien
and Harvey B. Jackson
Attorneys Patented Nov. 30, 1948

2,455,086

UNITED STATES PATENT OFFICE 2,455,086

CENTRIFUGALLY OPERATED, EXPANDING SHOE TYPE, AUTOMATIC CLUTCH

Gus S. Papas, Chicago, Ill., assignor of one-third to Harry A. Contos, Chicago, Ill.

Application June 26, 1946, Serial No. 679,371

5 Claims. (Cl. 192—105)

1

The present invention relates to novel and useful improvements in an automatic clutch, pertaining more particularly to an automatically actuated centrifugal clutch.

The principal objects of my invention are to provide an automatic clutch having a simplified construction, an equalized and smooth gripping action, reliable means responsive automatically to centrifugal force for engaging and releasing the clutch, wherein chattering and binding and uneven wear of the friction surfaces are minimized, and which may be easily disassembled or installed for repairs or servicing.

These, together with numerous other objects of the invention which will later become apparent as the following description proceeds, are attained by my device, one embodiment of which has been illustrated by way of example only in the accompanying drawings, wherein:

Figure 1 is a front elevational view of the invention;

Figure 2 is an end elevational view of the invention;

Figure 3 is a vertical sectional view taken substantially upon the line 3—3 of Figure 2;

Figure 4 is a vertical sectional view taken substantially upon the line 4—4 of Figure 1;

Figure 5 is a sectional detail view, taken substantially upon the line 5—5 of Figure 3;

Figure 6 is a perspective view of one of the centrifugally actuated wedge members; and Figure 7 is a detail, in perspective of the adjacent edges of a pair of shoes, to which the wedge of Figure 6 is to be applied.

In the accompanying drawings, wherein like numerals designate like parts throughout the various views of the drawings, 10 designates generally my improved clutch, which consists generally of a clutch drum 12 having an inturned cylindrical flange 14 whose inner surface 16 constitutes a friction surface of the improved clutch. An enlarged boss 18 disposed centrally of the drum 12 is adapted and bored to receive a pair of ball bearings 20 which rotatably support a shaft 22, which constitutes the driving shaft of a machine to which my clutch is applied. Suitably secured upon the shaft 22 in any desired manner, is a clutch plate 24, which is preferably in the form of a cylindrical disk or drum. The clutch plate 24 is disposed in proximity to the clutch drum 12 and carries at its free end, a closure plate 26 rigidly attached thereto as by screws 28 and proportioned and arranged to form a closure in cooperation with the flange 14 for the clutch mechanism to be set forth hereinafter.

2

A plurality of arcuate clutch friction shoes 30 are disposed circumferentially inside the clutch drum flange 14, and have their adjacent edges in slightly spaced position as set forth hereinafter. Each of the arcuate shoes is provided with a lining 32 of any suitable frictional material for the purpose of cooperating with the clutch surface 16 of the clutch drum 12. As best shown in Figure 5, the shoes 30 are formed with a depending flange 34 having radially disposed slots 36 which are slidably engaged by screws 38 secured to the inner surface of the cover plate 26. The screws 38 and the slots 36 are so arranged, that each is freely slidable radially of the closure plate 26. As shown more clearly in Figure 3, a plurality of elongated slots and cooperating screws 36 and 38 respectively, are positioned upon each clutch shoe 30, and at its extremities, each shoe is formed with an inturned portion 40 which is generally triangular in shape and between the adjacent portions 40 of adjacent shoes 30, a wedge shaped space is left as shown clearly in Figure 3. A plurality of springs 42 are provided for yieldingly urging the individual shoes radially inward towards the clutch plate 24, these springs being attached in pairs along the longitudinal axis and adjacent the medial center of the clutch shoes 30 as shown in Figures 4 and 5, with their inward ends attached adjacent the opposite extremities of the clutch plate 24. This arrangement of springs is designed to prevent binding of the clutch shoes at their points of sliding attachment to the closure plate 26 and to promote their uniform engagement and release from the clutch surface 16.

Adjacent each of the wedge shaped spaces provided between adjoining edges 40 of the clutch shoes, is provided a weighted wedge member 44 having a wedge shaped head 46 and a radially extending round shank 48. Each of the shank portions 48 is reciprocatingly received in radial bores 50 formed at appropriately spaced intervals in the clutch plate 24. A coil spring 52 is received in the bottom of each bore 50 and yieldingly urges the plunger 48 radially outwardly of the bore 50. As clearly indicated in the drawings, the wedge shaped head 46 extends transversely substantially the full width of the clutch shoes in order to effect an even wedging action therebetween.

From the foregoing explanation, the operation of the device will be now apparent. Upon rotation of the driving shaft 22, the attached clutch plate 24 and associated closure plate 26 rotates therewith, carrying with them the arcuate segmental clutch shoes 30 and the centrifugal wedge members 44. When the speed of rotation of the members exceeds a predetermined rate, and consequently the centrifugal force applied to the wedges 44 exceed a predetermined value, the wedges are urged upwardly and radially of the clutch plate 24 and into wedging engagement between the adjacent wedge surfaces 40 of the clutch shoes, it being understood that the spring 42 has a calibrated strength sufficient to give the desired yielding opposition to the movement of the wedge. After an initial movement of the wedges 44, subsequent movement thereof drives the floating shoes 30 radially outward until the linings 32 contact the clutch surface 16 carried by the clutch drum 12 which will be attached in any suitable manner to the driven element of the machine. It will be apparent that the strength of the frictional engagement between the driving and driven members 30 and 16, will be in direct proportion to the centrifugal force and hence to the seat of rotation of the driving shaft 22. Conversely, as the speed of rotation falls below a predetermined value, the pre-tensioned springs 42 will retract the shoes and release the clutch engagement between the clutch plate 24 and the clutch surface 16.

It will be evident from the foregoing, that each of the clutch shoes is freely floating within the confines of slots 36 in flanges 34 and hence is free to seat fully and evenly upon the adjacent surface 16 of the clutch drum. The wedges 44 not only serve to urge the shoes 30 radially outwardly of the disk 24, but also serve to maintain an even spacing between the shoes around the circumference of the drum. This is made possible by the fact that each wedge 44 is urged outwardly in an equal distance by the centrifugal force of rotation to maintain the even space relationship between the shoes 30. As is readily understood, shoes 30 are retained on plate 26 by means of screws 38. By the foregoing arrangement, a more even centering of the shoes upon the clutch surface 16 is obtained, together with a more even application of clutch pressure between the cooperating surfaces.

It will be evident that the principles of my invention may be incorporated in various structures, and hence I do not desire to be limited to the exact modification shown in the drawings. Accordingly, I do not limit myself to the details of construction shown and described, but may avail myself of all suitable modifications falling within the scope of the appended claims.

I claim as my invention:

1. A friction clutch consisting of driving and driven members, said driven member including a peripheral flange having an internal, peripheral clutch surface, said driving member being housed axially within and rotatably supported by said driven member, a plate carried by said driving member, a plurality of arcuate clutch shoes terminating as inturned triangular ears at each extremity and having clutch linings upon their outer surfaces, spring means on each ear and connected to said plate for mounting said shoes upon said driving member for outward movement relative thereto, wedge means disposed between adjacent edges of said triangular ears, said spring means being adapted for releasing said brake shoes, and tension means responsive to centrifugal force for actuating said wedge means to engage said shoes with said driven member.

2. A friction clutch consisting of driving and driven members, said driven member including a peripheral flange having an internal, peripheral clutch surface, said driving member being housed axially within and rotatably supported by said driven member, a plate carried by said driving member, a plurality of arcuate clutch shoes terminating as inturned triangular ears at each extremity and having clutch linings upon their outer surfaces, spring means on each ear and connected to said plate for mounting said shoes upon said driving member for outward movement relative thereto, wedge means disposed between adjacent edges of said triangular ear, said spring means being adapted for releasing said brake shoes, and tension means responsive to centrifugal force for actuating said wedge means to engage said shoes with said driven member, said shoes having a lateral supporting flange, and means for mounting said flange in radially slidable and guided relation upon said plate.

3. A friction clutch consisting of driving and driven members, said driven member including a peripheral flange having an internal, peripheral clutch surface, said driving member being housed axially within and rotatably supported by said driven member, a plate carried by said driving member, a plurality of arcuate clutch shoes terminating as inturned triangular ears at each extremity and having clutch linings upon their outer surfaces, spring means on each ear and connected to said plate for mounting said shoes upon said driving member for outward movement relative thereto, wedge means disposed between adjacent edges of said triangular ears, said spring means being adapted for releasing said brake shoes, and tension means responsive to centrifugal force for actuating said wedge means to engage said shoes with said driven member, said wedge means being carried and guided by said driving member and being reciprocable radially thereof.

4. The combination of claim 1, wherein a closure plate is carried by said driven member.

5. A friction clutch consisting of driving and driven members, said driven member including a peripheral flange having an internal, peripheral clutch surface, said driving member being housed axially within and rotatably supported by said driven member, a plate carried by said driving member, a plurality of arcuate clutch shoes terminating as inturned triangular ears at each extremity and having clutch linings upon their outer surfaces, spring means on each ear and connected to said plate for mounting said shoes upon said driving member for outward movement relative thereto, wedge means disposed between adjacent edges of said triangular ears, said spring means being adapted for releasing said brake shoes, and tension means responsive to centrifugal force for actuating said wedge means to engage said shoes with said driven member, said shoes each having a pair of medial and lateral supporting flanges and means for mounting said flanges in radially slidable and guided relation upon the plate, there being at least three arcuate shoes.

GUS S. PAPAS.

REFERENCES CITED

The following references are of record in the file of this patent:

UNITED STATES PATENTS

| Number | Name | Date |
| --- | --- | --- |
| Re. 22,682 | Dodge | Oct. 16, 1945 |
| 2,027,970 | Gillies | Jan. 14, 1936 |
| 2,034,988 | Nilsson et al. | Mar. 24, 1936 |